J. VOLLMER.
LUBRICATOR.
APPLICATION FILED JULY 3, 1905.
901,502.
Patented Oct. 20, 1908.
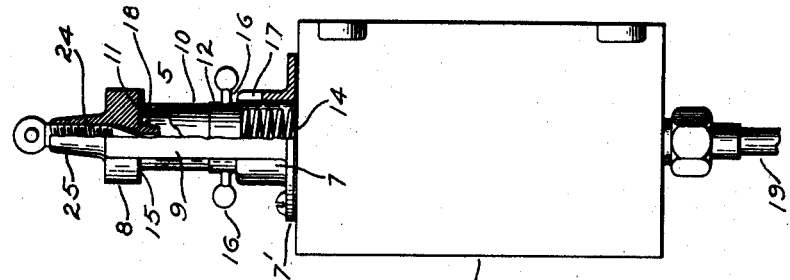
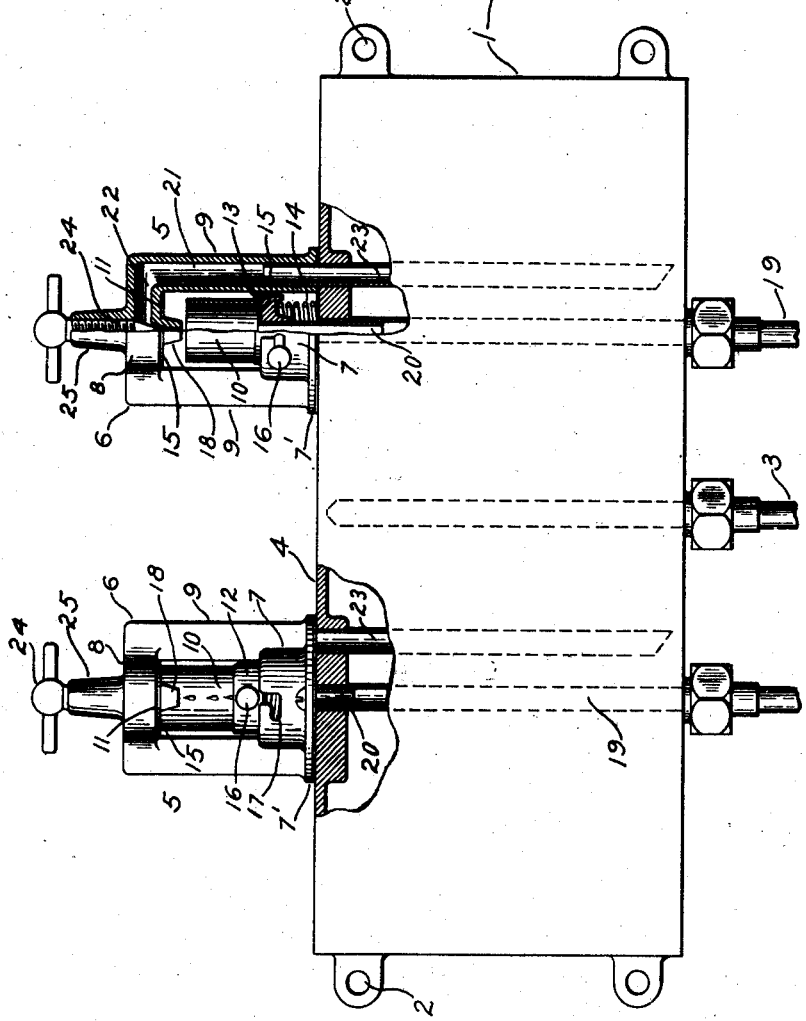
WITNESSES:
INVENTOR:
JOSEF VOLLMER.
By
ATTY.

UNITED STATES PATENT OFFICE.

JOSEF VOLLMER, OF BERLIN, GERMANY, ASSIGNOR TO GENERAL ELECTRIC COMPANY, A CORPORATION OF NEW YORK.

LUBRICATOR.

No. 901,502.      Specification of Letters Patent.      Patented Oct. 20, 1908.

Application filed July 3, 1905. Serial No. 268,020.

*To all whom it may concern:*

Be it known that I, JOSEF VOLLMER, a subject of the Grand Duke of Baden, Germany, residing at Berlin, Germany, have invented certain new and useful Improvements in Lubricators, of which the following is a specification.

In lubricating systems employing sight-feed glasses, the glasses become clouded and dirty with use and require to be cleaned from time to time. This necessitates removal of the glasses and with the constructions heretofore proposed, the removal of the glasses requires unscrewing and otherwise disconnecting the parts which serve to hold the glasses in place. This operation is objectionable and troublesome, as it requires tools, and takes considerable time, especially in multi-feed lubricating systems, such for instance as are used on automobiles where as many as ten or more feeds are sometimes employed.

The object of my invention is to overcome the objections above noted by so constructing and arranging the parts that the sight-feed glasses can be securely held in place and at the same time be quickly removed when desired with a minimum of trouble and danger of breaking.

In carrying out my invention I employ a supporting frame for the glass which is adapted to be connected in each feed pipe of the lubricating system, and provided on the frame are abutments between which the sight-feed glass is held. One of the abutments preferably takes the form of a spring-pressed follower which engages one end of the glass and normally holds the latter against the other or relatively stationary abutment. The follower being spring-supported, prevents the glass from loosening or moving from its proper position under the vibrations or shocks of the vehicle incident to travel. In order to remove the glass for cleaning, the follower or movable abutment is depressed or moved away from the fixed abutment against the tension of its supporting spring and when depressed is adapted to be held so as to remove all pressure from the glass and permit it to be taken out. Any suitable retaining means may be employed for holding the follower in its depressed position, such for example, as a bayonet-joint-construction. This arrangement for mechanically holding the follower greatly facilitates the handling of the glass because both of the operator's hands are thereby free to remove, clean and replace the glass without further attention to the follower.

For an understanding of the details of construction and the features of novelty, reference is to be made to the following description taken in connection with the accompanying drawings, and to the claims appended hereto.

In the accompanying drawing which illustrates one embodiment of the invention, Figure 1 is a front view of a multi-feed lubricator showing one of the sight-feed devices in elevation and the other in quarter-section, with portions of the lubricant containing chamber broken away; Fig. 2 is an end view of the lubricator also showing a sight-feed device in quarter-section.

I have elected to illustrate the invention as applied to a forced feed lubricator, such as is used for automobiles and adapted to be applied to the dash of the vehicle in sight of the operator. It is equally adapted however, for use in gravity-feed lubricating systems and also in single as well as multi-feed systems.

An important feature of my invention resides in the fact that the glasses may be removed under certain conditions without interfering with the operation of the parts supplied with lubricant.

Referring to the drawings, 1 represents a pressure tank which is provided with apertured lugs 2 for securing it to the dash of the vehicle or other support and is supplied with lubricant through a supply-pipe 3 from a power pump usually driven by a suitable part of the automobile. The top 4 of the pressure tank, which may be removable or not as desired, supports one or more sight-feed devices 5, the number employed depending upon the number of parts of the power system desired to be lubricated. They are secured to the top or cover 4 in any suitable manner. Each comprises a supporting frame 6, preferably a cast metal piece formed with a hollow cylindrical base 7 having a circumferential flange 7', a top 8, and connecting portions or columns 9. Within the space between the columns, the top and the base, is a transparent inclosure or sight-feed glass 10 which is preferably cylindrical and has its ends dressed off flat. The under surface 11 of the top 8 of the supporting frame is faced off to correspond to the upper end of the sight-feed glass and forms a stationary abutment therefor. The cylindrical base 7 serves as a housing for the spring-pressed follower or movable abutment 12, upon which the said glass is seated. Around the periphery of the follower is an axially extending flange or rim 13 within which the glass is disposed so as to be maintained in proper position. Between the follower and the top of the pressure chamber is a helical compression spring 14 which urges the follower and the glass supported thereon toward the fixed abutment 11. The spring also permits the follower to be depressed for disengaging the upper end of the glass from the fixed abutment to permit removal thereof. At each end of the glass is a soft gasket 15 which makes a perfect seal so as to prevent entrance of foreign matter.

The glass in the left-hand feed device, Fig. 1, is shown in its normal or closed position, while that in the right-hand device is shown in its lowered or opened position for permitting removal thereof. The follower is provided with one or more radial pins or projections 16 which are adapted to interlock in L-shaped slots 17 provided in the cylindrical portion of the base 7, the same forming a bayonet-joint-construction for holding the abutment in depressed position.

The lubricant is fed through the sight-feed glass from a nozzle 18 formed in the top 8 of the supporting frame 6 and disposed axially of a feed pipe 19, which extends through the top and bottom wall of the pressure chamber 1 and leads to the part to be lubricated. The pipe 19 ends at the upper surface of the tank, and depending from and carried by the follower is a short tube 20 which telescopes in the pipe 19, thereby permitting relative movement between the pipe and abutment without opening communication with the atmosphere and thereby excluding foreign matter. The supply of lubricant from the tank to the nozzle may be provided in any desired manner. I prefer, however, to core out a passage 21 in one or both of the columns 9, which communicates with a nozzle opening through a short cored-out passage 22 in the top 8 of the frame. The lower end of the passage 21 connects with an inlet pipe 23 in the tank. With this arrangement the lubricant is forced into the tank under pressure through the supply-pipe 3 and thence passes through the pipe 23, passages 21 and 22 and the nozzle 18, from which it passes drop by drop through the sight glass 10 to the pipe 19 and thence to the part to be lubricated. The feed from the nozzle is controlled by a needle valve 24 which is arranged in a threaded boss 25 formed in the top of the supporting frame.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,

1. In a sight-feed lubricator, the combination of a sight glass, a support therefor, and a spring-pressed holder forming the sole retainer for the glass and adapted by a single movement away from the support to permit the glass to be instantly removed without subjecting it to stress.

2. In a sight-feed lubricator, the combination of a sight glass, a relatively fixed abutment and a depressible abutment which yieldingly maintains the glass in fixed relation to the first abutment and when depressed permits the glass to be instantly removed without further movement of the abutment and without subjecting the glass to stress.

3. In a sight-feed lubricator, the combination of a sight glass, a relatively fixed abutment, a movable abutment which yieldingly maintains the glass in fixed relation to the first abutment, said movable abutment comprising a follower depressible in an axial direction away from the fixed abutment for removing the glass, a packing between the end of the glass and the follower, and an elastic member which urges the follower and the glass towards the fixed abutment and yields when the follower is depressed.

4. In a sight-feed lubricator, the combination of a sight glass, a feed nozzle, a fixed abutment adjacent to the nozzle which engages one end of the glass, a movable abutment which engages the other end, a spring which yieldingly supports the abutment, and operates through the latter to maintain the glass in position, a housing for the spring and movable abutment, and means exterior to the housing which is connected to the movable abutment for permitting it to be depressed against the tension of the spring for removal of the glass.

5. In a sight-feed lubricator, the combination of a sight glass, a feed nozzle, an abutment adjacent thereto which engages one end of the glass, means for holding the said glass against the abutment and adapted to be depressed in a direction away from the fixed abutment, and locking means for holding said means in its depressed position for permitting the glass to be disengaged from the fixed abutment and removed.

6. In a sight-feed lubricator, the combination of a sight glass, a supporting frame, a feed nozzle secured to the supporting frame, a fixed abutment formed on the frame and disposed around the nozzle which engages one end of the glass, a movable abutment which engages the other end of the glass, a means which normally urges the latter abutment and the glass toward the fixed abutment, a housing for the said means and the movable abutment having slots formed in the wall thereof, and projections on the movable abutment which are adapted to engage in the slots for holding the abutment in depressed position to permit removal of the glass.

7. In a sight-feed lubricator, the combination with a supporting frame comprising a base, a top portion and connecting portions or columns, of a sight glass, a feed nozzle on the top portion of the frame, an abutment adjacent the nozzle which engages one end of the glass, a movable abutment or follower arranged adjacent the base of the frame which supports the glass and holds it against the other abutment, and a spring arranged to act on and permit the movable abutment to be moved away from the other abutment against the tension of said spring for the instant removal of the glass without subjecting it to stress.

8. In a lubricator, the combination of a sight glass, a fixed abutment which engages one end of the glass, a nozzle for feeding lubricant, a follower which engages the other end of the glass and is movable with respect to the fixed abutment, and a tube carried by and movable with the follower and arranged in line with the nozzle for conveying away the lubricant.

9. In a lubricator, the combination of a sight glass, a fixed abutment which engages one end of the glass, a nozzle for feeding lubricant, a follower which engages the other end of the glass and is movable toward and from said fixed abutment, a tube carried by the follower and arranged in line with the nozzle which conveys away the lubricant, and a feed conduit with which the tube on the follower is connected in telescoping relation.

10. In a lubricator, the combination of a sight glass, a fixed abutment which engages one end of the glass, a nozzle for feeding lubricant, a follower which engages the other end of the glass, a tube carried by the follower and arranged in line with the nozzle which conveys away the lubricant, a feed conduit with which the tube and the follower are connected in telescoping relation, a spring which acts through the follower to maintain the glass in position between the abutment and the follower and permits the latter to be depressed for removing the glass, and a locking means for holding the follower in depressed position.

In witness whereof I have hereunto set my hand this 3d day of June, 1905.

JOSEF VOLLMER.

Witnesses:
  MAX HAMBURGER,
  JULIUS RUMLAND.